United States Patent [19]

del Valle et al.

[11] 4,120,983
[45] Oct. 17, 1978

[54] HYDROXYPROPYLATED, EPICHLOROHYDRIN CROSSLINKED TAPIOCA AND CORN STARCH DERIVATIVES

[75] Inventors: Frank del Valle; John V. Tuschhoff; Charles E. Streaty, all of Decatur, Ill.

[73] Assignee: A. E. Staley Manufacturing Company, Decatur, Ill.

[21] Appl. No.: 615,629

[22] Filed: Sep. 22, 1975

Related U.S. Application Data

[63] Continuation of Ser. No. 112,660, Feb. 4, 1971, abandoned.

[51] Int. Cl.$^2$ ............................ A23L 1/10; A23L 3/02
[52] U.S. Cl. .................................... 426/405; 426/407; 426/661; 426/521; 127/70; 536/106
[58] Field of Search ...................... 260/233.3; 127/70; 426/399, 401, 407, 408, 520, 521, 661, 405; 536/106

[56] References Cited

U.S. PATENT DOCUMENTS

| | | | |
|---|---|---|---|
| 3,208,994 | 9/1965 | Flodin | 260/233.3 |
| 3,369,910 | 2/1968 | Ganz | 260/233.3 |
| 3,422,088 | 1/1969 | Tuschhoff | 260/233.3 |
| 3,437,493 | 4/1969 | Robinson | 260/233.3 |

Primary Examiner—Norman Yudkoff
Attorney, Agent, or Firm—Howard J. Barnett; Charles J. Meyerson

[57] ABSTRACT

Thin-thick, hydroxypropylated, epichlorohydrin crosslinked starch derivatives for continuous process pressure cooking of neutral or acid food systems. The degree of cross-linking for these starch derivatives is carefully controlled so that they are initially low in viscosity and develop full viscosity only under high pressure and temperatures. These characteristics make these starches ideally suited for use in recently developed food canning processes in which initial rapid heat penetration without degrading the starch derivative is necessary for the heat sterilization of the canned foods. For the new continuous retort processing, the usual time allowed for the complete retorting cycle is less than twenty minutes, and this must include heat sterilization. As the retort media using the starch derivative of the invention reaches the heat sterilization temperature it then increases in viscosity to a range which retains the canned food product in a desirable suspension. In addition, these starch derivatives are non-gelling and freeze-thaw stable. The new starches are also useful in making prepared foods which, although not subjected to retorting, are processed at high temperatures ranging from about 190° F. to about 240° F.

5 Claims, 4 Drawing Figures

HYDROXYPROPYLATED, EPICHLOROHYDRIN CROSSLINKED TAPIOCA AND CORN STARCH DERIVATIVES

DISCLOSURE OF THE INVENTION

This invention is directed to hydroxypropylated, epichlorohydrin cross-linked starch derivatives which have excellent heat penetration characteristics, specific alkali fluidity characteristics and very pronounced thin-thick viscosity behavior when retorted, which make these starch derivatives particularly useful for continuous retort processes in which high temperatures are attained rapidly and maintained for thermophile sterilization. The alkali fluidity test is used as a means of determining the proper degree of cross-linking during the reaction with epichlorohydrin, and it is believed that the degree of cross-linking determines viscosity behavior when combined with the correct degree of hydroxypropyl substitution. The hydroxypropylation substitution is usually done first, and it appears that the optimum range for the hydroxypropyl degree of substitution (d.s.) is from about 0.085 to 0.30 to obtain the desired thin-thick behavior.

Before retorting, these starch derivatives have a Brookfield viscosity less than about 1,100 cps. in a 5% (dry substance basis) sample, prepasted in a buffer solution. After retorting under pressure, and at temperatures which in some cases are up to 240° F., the Brookfield viscosity is more than 3,000 cps., measured at a specific pH, determined by the particular starch derivative. These starch derivatives have the pronounced "thin-thick" viscosity behavior needed for continuous retorting, under both acid pH conditions and near neutral pH.

The modified starches of the invention are useful as thickeners in canned pie fillings, puddings, soups, sauces and in other prepared foods utilizing continuous retort equipment or static sterilizers. These thin-thick starch derivatives allow rapid heat penetration while thin to facilitate product sterilization, and then thicken to the desired viscosity without degrading. Faster retorting is preferred, because holding foods at retort temperatures for long periods greatly reduces flavor. The recently developed continuous, high temperature food processing equipment requires a starch derivative which is initially low in viscosity, will allow rapid heat penetration during retorting, and which will attain a final high viscosity after retorting at high temperatures. When conventional starches are used, they are either degraded, or the required temperature for the heat sterilization step of the process is never attained in the internal portion of the canned article being processed.

DESCRIPTION OF THE PRIOR ART

A modified starch derivative which exhibited some degree of thin-thick characteristics is described in U.S. Pat. No. 3,422,088, assigned to a common assignee herewith. The composition described in that patent includes phosphorus oxychloride to accomplish cross-linking. It has been found that the starch derivative described in the above patent is not stable at the elevated temperatures required for retort canning, because the cross-linking breaks down, and the starch becomes thick too soon at the periphery of the food mass, thereby preventing further heat penetration.

Cross-linking of the starch product of this invention is accomplished by a reaction with epichlorohydrin, and the characteristics of the resulting product differs from the phosphorus oxychloride derivative because our starch product is capable of thickening after rapid heating to a temperature of about 230° F. for less than 20 minutes. Under such temperature conditions, the modified starch of U.S. Pat. No. 3,422,088 tends to become unstable.

In high volume canning processes, the time saving made possible by our new product represents a substantial reduction in food processing costs, since it means that a substantially greater amount of perishable fruits or vegetables can be canned with less capital investment for processing equipment, even during peak volume production necessitated by the relatively brief harvest seasons for most fruits and vegetables. With the continuous retort process, no additional equipment or manpower is required, even during the peak volume canning periods.

Another method of modifying starch to obtain thin-thick behavior is described in U.S. Pat. No. 3,463,668. That patent is directed to a reaction of a glycine and a chlorine-containing oxidizing agent with a granular starch to obtain an inhibited product possessing labile cross-linkages. There is no disclosure here of heat penetration stability, and the patent disclosure indicates that maximum retort thickening of this product took about an hour and a half, much more time than for the new starch product of the subject invention, and certainly in excess of the time allowable for high volume, continuous retort canning processes. Some means of continued agitation would be required if this type of starch were used to keep the food particles in the can from settling to the bottom.

SUMMARY OF THE INVENTION

This invention provides a hydroxypropylated, epichlorohydrin cross-linked starch having thin-thick viscosity characteristics which make it peculiarly suited for continuous retort (pressure cooking) canning processes in which an initial low viscosity, high heat transfer characteristic allows rapid heat sterilization of the sealed mixture of modified starch and canned food, and in which the modified starch thereafter thickens substantially to maintain the canned foods in suspension. The product has a hydroxypropyl degree of substitution (d.s.) of about 0.085–0.30, which is carefully balanced with a degree of cross-linking (evidenced by alkali fluidity tests) to give an initial viscosity before continuous retorting below about 1,000 centipoise (cps). Brookfield viscosity, and a final viscosity of above about 3,000 cps. Brookfield after retorting.

The hydroxypropylated, epichlorohydrin cross-linked starch derivatives of the invention do not degrade when subjected to the rapid heat cycle necessary for the sterilization procedure, and thicken well in either a nearly neutral or in an acid food system. A corn based starch derivative is presently preferred for use in acid food systems, while a tapioca based starch derivative functions very well in nearly neutral media.

PREFERRED EMBODIMENTS

The following detailed description serves to illustrate, but is not intended to limit the presently preferred mode of practicing the invention.

DRAWINGS

FIG. 1 of the drawings is a graph showing the heat penetration rate during continuous retorting measuring internal temperatures versus time for a canning medium including a corn starch derivative made according to the invention, and showing similar observations for comparison taken for a sample canning medium made up from a commercial canner's starch;

Figure 1:
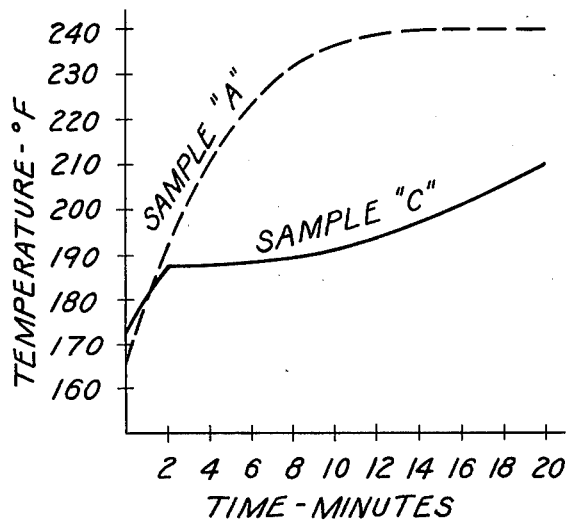

The apparatus used for obtaining the information recorded in FIGS. 1-4 was designed to duplicate on a smaller scale the process environment for a typical continuous retorting system. Later comparisons with performance tests on actual continuous retorting equipment confirmed the accuracy of the observations made with the laboratory equipment.

The test equipment used to obtain the data recorded in FIGS. 1-4 included a mineral oil bath, controlled heat input means for maintaining the bath at the required temperature range (about 190°-260° F.), and oscillatable conveyor means for moving the individual test cans through the oil bath. Thermocouples for recording internal food mass temperatures are provided to be inserted in each test can, and have pressure sealing means for the external connection. A thermocouple is also provided to record the oil bath temperature. Each can sample weighed about 300 grams, since the test cans were number "one" size (about 300 cm$^3$).

For the neutral medium tests, each sample was made up in a pH 6 buffer medium comprising about 10 gram $Na_2HPO_4$/1,000 ml. water. The pH was adjusted with citric acid to obtain the exact pH. The amount of starch sample, dry substance basis, was about 5% of the total weight of the samples tested.

The individual cans were clamped to the conveyor means, and the thermocouples inserted. The oil bath temperature control was set for a bath temperature of about 240° F., plus or minus about 2° F., and the filled test cans were immersed in the heated oil bath, and rotated about 270° in one direction, and then in the opposite direction at a total speed of about 20 rpm. for a time period of about 20 minutes. Samples were removed at the times (dots) indicated in FIGS. 2 and 4 to measure the respective Brookfield viscosity behaviors. The slurries used in these tests were mixed to duplicate the food canner's typical canning medium requirements.

The above graphs clearly demonstrate that the starch derivatives of the subject invention satisfy the most important requirements for a thin-thick retort canner's starch, more particularly, a starch derivative which is useful in the higher production rate, continuous retort canning processes which require peak temperatures in excess of 200° F. within the food mass within a time period of less than 20 minutes. For example, the sample canning medium of FIGS. 1 and 3, which included starch derivatives made according to the invention, showed excellent heat penetration characteristics when continuously retorted, especially when compared to a medium made with commercial canner's starch. The canning medium made with the new corn starch derivative A reached a minimum temperature of 240° F. within 14 minutes for the sample tested under acid conditions (pH 3.5). This is an excellent heat penetration rate for continuous retorting. A comparison run was done with a canning medium made with an acetylated, commercial canner's starch at pH 3.5. As can be seen, this sample did not even attain a temperature of 210° F. until about twenty minutes after retorting had commenced. A temperature of 210° F. was attained by Sample A made according to the invention after less than five minutes into the retorting process. The curve for heat penetration rate in this example was run at a pH of 3.5, which is normally expected, in most acid retort canning systems. The canning medium made from the corn starch derivative of the invention shows completely acceptable performance in heat penetration rates in an acid medium. On the other hand, the heat penetration rate for the media using commercial canner's starch was not high enough to use in the continuous retort processes, because the complete sterilization from thermophile bacteria could not be assured.

Figure 2:
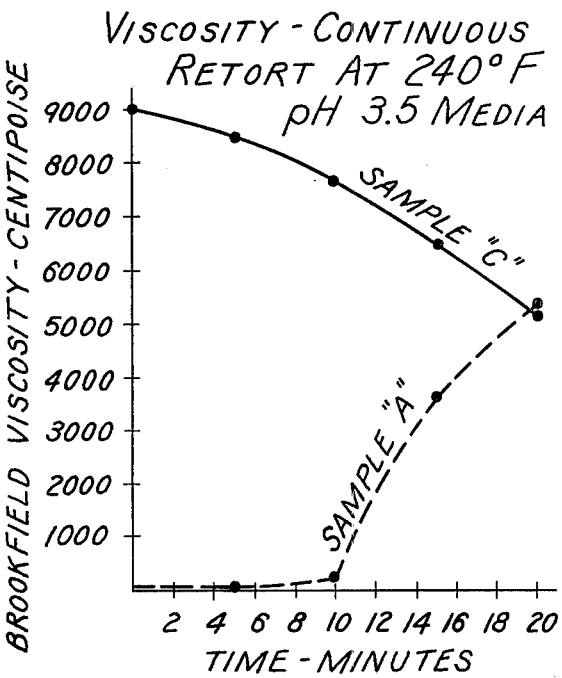
FIG. 2 is a graph showing the viscosity changes measured for the medium including corn starch derivative to the sample canning medium made with commercial canner's starch observed in FIG. 1.

Viscosity tests were also run at a pH of 3.5, for the new corn starch based derivative, Sample A and the same commercial canner's starch, and the results were recorded against time in FIG. 2. It can be seen that the Sample A exhibits true "thin-thick" behavior, the viscosity increase being initially retarded, and then increasing rather abruptly. For this derivative, the process temperature should be kept at 240° F. or lower to avoid thermal degradation. In contrast, the medium made with commercial canner's starch is not even stable at 200° F. As shown in FIG. 2, thermal degradation is indicated by the decreasing viscosity for the commercial canner's starch sample. As can be seen, the viscosity decrease and degradation of the commercial sample began almost immediately. The delayed, but rapid thickening characteristic is important, because it means that the agitation of the canned food product can be terminated in a much shorter time after retorting without concern that the food portion of the canned material will settle out.

FIGS. 1 and 2 clearly demonstrate that our new starch derivative is ideally suited for continuous retort canning because of its ideal heat penetration characteristic in combination with its thin-thick viscosity behavior during retorting at high temperature under pressure. The new starch derivative remains thin long enough for the high sterilization temperatures to be attained, and then thickens without degradation.

Figure 3:
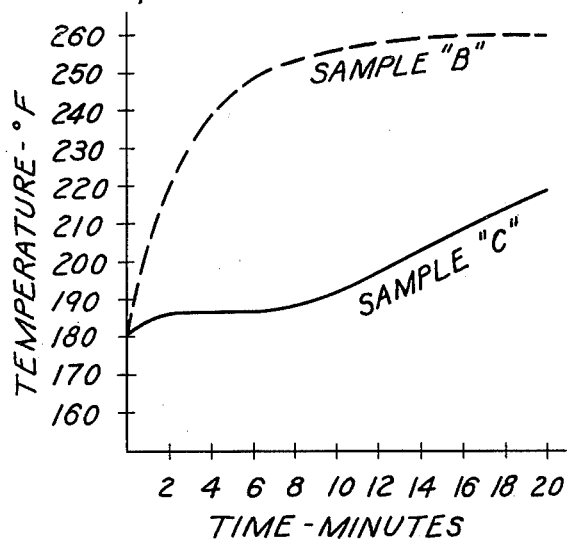
FIG. 3 is a graph showing test results for a canning media including a tapioca starch derivative made according to the invention showing the heat penetration rate during continuous retorting and comparing this product to the sample canning medium made with commercial canner's starch.
Figure 4:
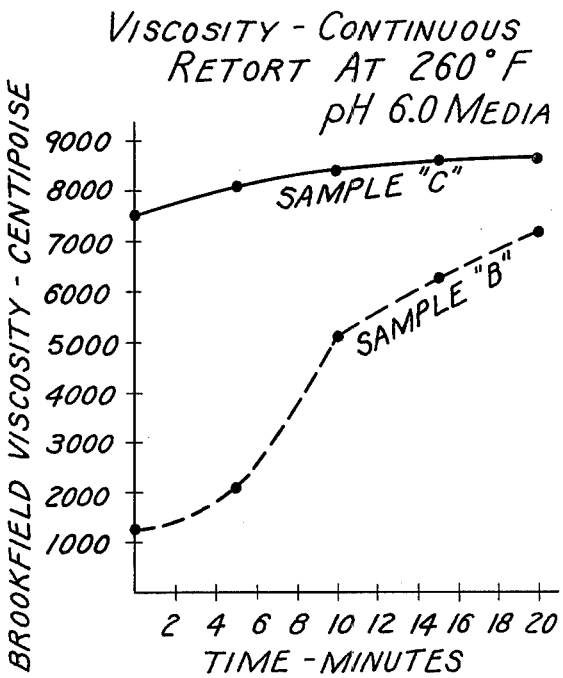
FIG. 4 is a graph which is similar to FIG. 2 comparing the canning medium made with the tapioca starch derivative to the canning medium made with commercial canner's starch.

FIG. 3 is similar to FIG. 1, but comparing a canning medium including the tapocia starch derivative made according to the invention (designated Sample B) to a canning medium containing the same commercial canner's starch used in FIGS. 1 and 2, and at pH 6. Sample B, containing the new starch derivative, exhibited a heat penetration rate which produced an internal temperature of 245° F. in about 5 minutes, while the medium containing commercial canner's starch (designated Sample C) tested under the same conditions did not even reach an internal mass temperature of 220° F. after 20 minutes. As shown in FIG. 4, the viscosity of Sample C was too high, even at the start of retorting. When compared to applicant's new tapioca retort canning starch derivative, Sample B, it can be seen that the medium prepared from commercial canner's starch does not reach a mass temperature sufficiently high to accomplish heat sterilization of the food mass within the required time, and would, therefore, not satisfy the requirements for continuous retort canning. In contrast, the canning medium prepared with applicant's new tapioca starch derivative proved completely suitable for the high production rate of continuous retort canning.

The viscosity curves shown in FIG. 4 for Sample B are also considered very satisfactory for retort canning. Sample B attained a Brookfield viscosity of better than 5,000 cps. after ten minutes of continuous retorting at pH values of about 6.0 at a retort temperature of about 260° F. without deterioration of the starch derivative. A steep increase in viscosity during retorting was observed after an initial low Brookfield viscosity of about 1,100 cps. before retorting to a viscosity of about 7,000 cps. Brookfield after 20 minutes of continuous retorting. During retorting, the internal temperature of the paste increased rapidly from an initial temperature of about 180° F. to the final retort temperature of about 260° F. The canning medium prepared from Sample B is most suitable for high temperature retort canning at near neutral pH, because it also exhibits the combination of excellent heat penetration and thin-thick viscosity behavior.

The particular modified starches of the invention observed above were found to have a hydroxypropyl degree of substitution (d.s.) per anhydroglucose unit of 0.085 to 0.3 d.s., with the preferred range being from 0.1 to 0.2. The degree of hydroxypropyl substitution is controlled by monitoring the extent to which the pasting temperature is depressed during the reaction. A pasting temperature range of about 148° F.–158° F. indicates the correct range of substitution.

The use of epichlorohydrin as a cross-linking agent is preferred, because it is acceptable as a food additive having no toxic reaction by-product, and because it is believed that the ether linkages obtained through use of this reagent are more stable than other types of linkages, such as ester linkages and acetyl type linkages. The amount of cross-linking is also carefully controlled by monitoring the alkali fluidity of the reaction mixture, and by neutralizing with sulfuric acid as soon as an alkali fluidity range from about 45–67 ml. measured on a 3 gm. starch d.s.b., in a 100 ml. solution is obtained for the tapioca starch derivative, and an alkali fluidity ranging from 60–90 ml. for a 4 gm. starch, d.s.b. in a 100 ml. solution is obtained in the case of the corn starch derivative. The reaction is stopped at this point since it has been found that this particular degree of crosslinking combined with the above hydroxypropyl degree of substitution will produce a starch derivative having the required heat penetration and stability and viscosity behavior for continuous retorting. A more narrow range of alkali fluidity is: for the tapioca starch derivative, 52–60 ml. 0.375N NaOH, 3g sample); and for the corn starch derivative, 70–78 ml. 0.375N NaOH 4g sample).

The alkali fluidity test referred to immediately above was found to be the most convenient means of controlling the degree of cross-linking, and is accomplished with the same equipment in all the examples given. The test is generally described in U.S. Pat. No. 3,238,193 at columns 7 and 8, lines 40–61 and 1–9, respectively. The concentration of the alkali starch dispersion for a particular test sample is determined by adding 90 ml. of 0.375 N sodium hydroxide to a slurry of neutralized, filtered, water-washed wet starch cake containing 3 or 4 grams (3 grams for tapioca, 4 gram for corn) of the starch derivative, dry solids basis (d.s.b.). The sample is slurried in water to make 10 ml. of total water prior to the addition of 90 ml. of 0.375 N sodium hydroxide. After mixing the starch slurry with the sodium hydroxide solution, the suspension is stirred at between 450 and 460 rpm. for three minutes in order to paste the starch. The resulting starch solution is poured into a fluidity funnel having a specific water time between about 30 and 40 seconds. The number of ml. of starch solution which flows through the funnel in the "water-time" (defined below) is the alkali fluidity of the starch. The extent of cross-linking is monitored by repeating the above test at regular intervals with samples taken from the reaction mixture. When the alkali fluidity test is within the desired range, the cross-linking reaction is stopped.

The fluidity funnel used for the alkali fluidity tests described herein comprises two main parts, a funnel body and a funnel tip threadably attached thereto. A simple plunger-type, tapered valve on a glass stem can be used to manually control flow through the funnel orifice. The funnel parts are precision-machined from stainless steel stock, and polished to very smooth surfaces on all parts which come in contact with the test samples.

The funnel body defines a generally cone shaped vessel having a 60° angle (or taper) between opposite, converging funnel walls. Funnel body height is sufficient to hold at least a 100 cm³ sample, and a 0.277 inch orifice and fluid passage is provided at the narrowest portion of the funnel for attachment to the funnel tip. The fluid passage is 1½ inches in length from the orifice to the narrow end of the funnel body. The opposite, wide orifice of the funnel body is oriented upwardly, and the tapered valve is inserted downwardly from above into the smaller orifice during the tests. Operation of this valve against the "water-time" of the funnel gives the test readings. The funnel tip is a cup shaped member, which is threadably received on the narrow end of the funnel body. The internal chamber of the funnel tip is hemispherical and has a 3/16 inch diameter with a lower central opening of 0.070 inch which is 0.0492 inches in length. The total height for the lower end of the funnel body passage to the lower external orifice of the funnel tip includes the height of the ball chamber 0.1008 inches) and the length (0.0492 inches) of the funnel tip opening.

The composite apparatus described above is vertically disposed above a graduated cylinder for the actual tests. At the beginning of each test, the "water-time" for the apparatus is checked by running 100 cm³ of pure water through the funnel and recording the total elapsed time. The "water-time" then becomes the time against which each sample is tested.

The flow through the funnel during the "water-time" is measured in cubic centimeter (cm³) and recorded after each test. The funnel is thoroughly washed between each test to avoid irregular observations. The above alkali fluidity test procedure was followed throughout the tests, using either a 2.5 gram or 3 gram d.s.b. starch derivative sample for tapioca, and a 4.0 gram d.s.b. sample for corn, as indicated.

The following examples illustrate some typical products which are made according to the teachings of the invention:

EXAMPLE 1

A slurry of 1,712 g. (1,500 g. d.s.b.) tapioca starch was prepared in 2,038 g. of water at a temperature of about 100° F. To this, 75 g. of anhydrous sodium sulfate, $Na_2SO_4$, and 177 g. of tribasic sodium phosphate, dodeca hydrate, $Na_3PO_4.12H_2O$ was added. Over a period of 30 minutes, 120 g. of propylene oxide was added to the slurry to form a hydroxypropylated starch intermediate. This reaction mixture was maintained at a temperature of about 100° F. for about 23 hours, and then 15 ml. of 1.5% (weight/volume) aqueous epichlorohydrin solution was added to the mixture. The pH was adjusted to pH 5.5 with 5 N sulfuric acid. The reaction mixture was then filtered, washed with 3 volumes of water and oven dried for about 12 hours at 104° C. The samples produced had alkali fluidities ranging from 63–73 cm$^3$ (3 gm. sample) and exhibited thin-thick behavior upon retorting.

The degree of hydroxypropyl substitution is controlled by testing the extent to which the pasting temperature has been lowered at certain time intervals during the hydroxypropylation reaction. Samples are taken from the reaction mixture at regular intervals, and a pH 6.5 phosphate buffer sample containing 1% NaCl is tested for pasting in a Brabender viscometer. When the temperature at which pasting occurs has been decreased by about 18°–24° F., the reaction is stopped by adding $H_2SO_4$. The hydroxypropyl degree of substitution will then be in the range of 0.085 to 0.3.

The preferred hydroxypropyl cross-linked tapioca starch produced by the above reaction has a hydroxypropyl degree of substitution of about 0.085–0.3, and has an optimum range of cross-linking indicated by the thin-thick behavior of various samples tested to be in the range of about 45–67 cm$^3$ for a 3 gm. sample. The tapioca starch derivative of the invention has the following interrelated characteristics which make the reaction product suitable as a retort starch:

(1) low initial Brookfield viscosity (below 1,100 cps) when used in a canning medium to permit rapid heat penetration for the thermophile sterilization performed in high rate, continuous retorting processes and high final Brookfield viscosity (above 3,000 cps.) after heating the retort medium to a temperature of at least 210° F. in less than about twelve minutes; and (2) good stability under near neutral pH conditions (from about 6.5 to 7.5) which are the conditions normally expected in retort processing of vegetables, puddings and similar foods.

This tapioca starch derivative has been tested for heat penetration by preparing a 5% d.s.b. retort medium in water, (pH of about 6.5–7.5) and retorting in a sealed container to a temperature of 240° F. The retort medium was observed for heat penetration during retorting with the following temperatures being recorded in the internal central portion the retort medium by means of temperature sensing probe extending into a sealed opening of the container:

5 min. — 214.5° F.
10 min. — 228° F.
15 min. — 235° F.
30 min. — 236° F.

Brookfield viscosity of the media before retorting was 750 cps. and after retorting is measured at 4900. The retort medium remains stable under these extremely high temperature conditions, and combined the optimum heat penetration characteristics with thin-thick behavior, which provides tapioca starch derivatives particularly well suited as a retort medium for continuous retort canning processes in which the heat sterilization and retorting process must be complete in 12 minutes.

EXAMPLE 2

The tapioca starch derivative as made in Example 1 has also been tested in actual food systems. In one example a retort medium was made up containing: 90% water, about 6% tapioca starch derivative, 3% sugar, 1% acid salts. The pH for the system was adjusted with vinegar to about 6.5 to nearly neutral. This medium was then mixed with 50–60% by weight of vegetables comprising a mixture of bean sprouts and similar vegetables. A comparison retorting medium was made up, also using the same materials in the same proportions, except that another commercial canning starch (a modified waxy maize) was substituted for the tapioca starch derivative of the invention. The retort bath temperature was adjusted to 260° F., both samples were then subjected to the same retorting conditions, and internal retort can temperatures were observed with the following results:

| Time | Temperature (° F.) Tapioca Starch Derivative | Temperature (° F.) Commercial Modified Waxy Maize |
| --- | --- | --- |
| 0 | 70 | 70 |
| 1 | 90 | 90 |
| 2 | 140 | 105 |
| 3 | 210 | 120 |
| 5 | 220 | 135 |
| 7 | 230 | 145 |
| 10 | 242 | 152 |
| 15 | 246 | 167 |
| 20 | 255 | 190 |

It can be seen from the above heat penetration comparison that the tapioca starch derivatives of the invention attained an internal mass temperature of at least 210° F. in 3 minutes, while the internal mass temperature of the comparison sample had attained only 120° F. The temperature range generally required for heat sterilization in continuous retorting had already been attained by the tapioca starch derivative after 3 minutes, and was not reached by the comparison sample during the complete 12 minute test.

The canned samples were then inspected for texture, taste, appearance, and viscosity and the tapioca starch derivative sample made according to the invention was excellent in every respect, and, in addition, it had attained the required heat sterilization temperature within the short time allotment (20 minutes) of the retort canning process, whereas the comparison sample had not attained the required sterilization temperature in the allotted time.

EXAMPLE 3

A series of tests were made with hydroxypropylated, epichlorohydrin cross-linked corn starch to determine the suitable cross-linking level for use as an acid medium retort starch. The samples for these tests were made as set forth below. Three 5 liter reactors were charged with 1,697 g. (1,500 d.s.b.) of pearl corn starch in 2,053 g. of water. The temperature of the slurries was about 100° F. Seventy-five grams of anhydrous sodium sulfate and 177 g. of $Na_2PO_4.12 H_2O$ were added to each slurry. Thirty minutes thereafter, 120 g. of propylene oxide was added to each reaction mixture.

After 23 hours, 1.5% (weight/volume) aqueous epichlorohydrin solution in concentrations ranging from 0.035–0.045% respectively (d.s.b. starch wt. basis). The sample was adjusted to a pH of 5.5 with 5 N sulfuric acid, filtered, washed with three volumes of water (by displacement) and air dried for about 12–16 hours. Retort media samples were made up using the above corn starch derivatives, on a 5% d.s.b. in water adjusted to a pH of 3.5. Brookfield viscosity was measured before and after retorting. The samples were then tested for heat penetration and viscosity behavior. Comparison was made of two slurries under the same retorting conditions to compare the corn starch derivative of the invention with a commercial, modified waxy maize canning starch. The pH for both samples was adjusted to about 3.5 which is the usual pH of acid retort canning media.

The samples were made up, 7% d.s.b. of the starch in water and heat penetration was observed as follows:

| Time (min.) | Temperature (° F.) Sample A - Corn Starch Derivative | Temperature (° F.) Sample "C" - Modified Waxy Maize |
| --- | --- | --- |
| 0 | 165 | 172 |
| 5 | 218 | 188 |
| 10 | 238 | 190 |
| 15 | 239 | 197 |
| 20 | 239 | 208 |

The viscosity measurements for the corn starch derivative of the invention were excellent, even though an acid pH of 3.5 was used for the test. As can be seen, the corn starch derivative reached a temperature of more than 215° F. in 5 minutes making it ideally suited to continuous retort processing which requires heat sterilization in 20 minutes. By comparison the modified waxy maize did not reach an internal mass temperature above 208° F. during the whole 20 minute retort time.

Alkali fluidity tests for a 4 gram sample of the corn starch derivative which performed well in the twenty minute continuous retorting process demonstrated that the degree of cross-linking for this hydroxypropylated acid-stable corn starch derivative should be in the range of 60–90 cm³. The preferred range is from 70–78 cm³. (4 gm. sample).

EXAMPLE 4

The corn starch derivative made in accordance with example 3 was then used to make an acid pH fruit pie filling and was retorted to observe its behavior. The retort medium slurry was made up first using 57.8% water, 18.8% corn syrup, 15% sugar, 8% corn starch derivative, and about 0.4% salt. The pH was adjusted with citric acid to about 3.5. This was then mixed in about a 50–60% by weight mixture with fresh frozen blueberries, and the mixture was placed in closed retort cans fitted with sealed temperature probes as before, and retorted. Bath temperature was 240° F. The internal food mass temperature was then recorded during retorting as follows:

| Time (min.) | Temperature (° F.) |
| --- | --- |
| 0 | 70 |
| 5 | 214 |
| 10 | 230 |
| 15 | 233 |
| 20 | 234 |

The above heat penetration rate proved to be excellent for continuous retorting, because the heat sterilization temperature range (above about 210° F.) was reached within 5 minutes into the process. The retorted product was excellent in texture, taste, appearance, flow characteristics, and stability, and met the requirements for heat sterilization temperatures needed in the short time period 20 minutes) for continuous retort food processing. Bostwick viscosity data observed for the pie filling product were excellent, reinforcing the observed desirable flow characteristics.

In comparing the above examples, it can be seen that the modified starches made according to the method of the invention gave excellent results in testing, and are, therefore preferred thin-thick hydroxypropylated, epichlorohydrin cross-linked starches for use in continuous retort canning processes which require a high initial heat penetration of the fluid starch medium and which are carried out in either an acid food system (pH about 3.5–4.5) such as blueberry pie filling, or in a nearly neutral food system (pH 6.5–7.5), such as vegetables or puddings. Heat penetration is best at low viscosity levels, but the starch viscosity is maintained high enough to support the food pieces being canned while avoiding splattering during can filling. After the heat sterilization step, the starch medium when used at an initial concentration of about 5% d.s.b. starch in pH 3.5 buffer solution (in the case of the corn starch derivative) thickens to a viscosity of about 5,000 cps., Brookfield, and about 7,000 cps. for a like sample of the tapioca starch derivative at a pH of 6. The high final viscosity effectively maintains the canned food in suspension.

The tapioca starch derivative of Example 1 proved most satisfactory in more neutral pH food systems which are typical of such bland foods as puddings, sauces, and most soups. The tapioca based starch derivative of the invention has generally the following properties:

Percent hydroxypropyl: 3.5% minimum, d.s.b.
Moisture content: 10–13%
pH (uncooked): 5.0–6.5
Alkali fluidity (3 gm. sample): 52–60 ml.

The Brookfield viscosity, observed for a 5% d.s.b. sample in a pH 3.5 buffer solution measures 1,000 cps. maximum before retorting, and reaches a minimum of 4,500 cps. after retorting. Heat penetration rate required during retorting is 205° F. after 5 minutes retorting, 220° F. after 10 minutes, and 230° F. after 15 minutes.

The corn based starch derivative of the invention, which is more suited for use in acid media foods, such as blueberry pie filling, and other fruit-type products, has generally the following properties:

Percent hydroxypropyl: 4.0% minium, d.s.b.
Moisture content: 10–13%
pH (uncooked): 5.0–6.5
Alkali fluidity (4 gm. sample): 70–78 ml.

The Brookfield viscosity, for a 5% d.s.b. sample in a pH 3.5 buffer solution is less than 200 cps. before retorting and more than 3,000 cps. after retorting. Heat penetration during retorting measures at 210° F. after 5 minutes, 225° F. after 10 minutes, 230° F. after 15 minutes and 233° F. after 20 minutes.

Since many embodiments of this invention may be made and since many changes may be made in the embodiments described, the foregoing is interpreted as illustrative and the invention is defined by the claims appended hereafter.

We claim:

1. In the method of continuous retort canning and sterilizing food products in individual sealed containers in which internal food mass temperatures of at least 210° F. are attained within about 10 to 20 minutes after the initiation of the food product heating cycle, and the food product including the starch derivative is first canned and sealed prior to sterilization, the improvement comprising the step of using as a principal food retort medium a hydroxypropylated, epichlorohydrin cross-linked starch derivative derived from a starch selected from the group consisting of corn starch and tapioca starch, said starch derivative having a degree of substitution of hydroxypropyl units of about 0.085–0.3, and having been subjected to epichlorohydrin cross-linking to obtain an alkali fluidity ranging from 45–70 cm$^3$. for a 3 gram sample in 0.375 N NaOH of the tapioca derivative and ranging from 60–90 cm$^3$. for a 4 gram sample with 0.375 N NaOH of the corn starch derivative, said starch derivative having an initial Brookfield viscosity before retort processing of less than about 1,100 centipoise when slurried in a retort medium having a pH of 3–7 and comprising about 50 gm. d.s.b. starch/1,000cm$^3$. water, and a final Brookfield viscosity of at least 3,000 to 7,000 centipoise after retorting said medium in said sealed containers with tumbling action for about 15–20 minutes by means of a heat source capable of raising the internal temperature of the retort medium to at least 210° F. to 240° F. said retort medium having a heat penetration rate without degrading the starch derivative such that the internal temperature of said retort medium is capable of attaining a temperature of at least 210° F. to 240° F. after heating under retort conditions for 8–12 minutes.

2. A method of continuous retort canning, particularly adapted for canning foods in an acid to neutral medium, the steps comprising:

(a) Preparing a 5–8% by weight dry solids aqueous slurry of a hydroxypropylated, epichlorohydrin cross-linked starch derivative, said starch derivative being selected from tapioca or corn starch having a degree of substitution of hydroxypropyl units of about 0.08–0.3 and having a level of cross-linking with epichlorohydrin sufficient to obtain an alkali fluidity ranging from 45–70 cm$^3$. for a test sample of the tapioca based starch containing 3 grams of the starch derivative in water to make 10 cm$^3$. plus 90 cm$^3$. of 0.375N NaOH, and an alkali fluidity in the range of 60–90 cm$^3$. for a 4 gram sample of the corn-based starch derivative;

(b) combining said aqueous slurry with a food material;

(c) adjusting 3–7.5;

(d) disposing the aqueous starch slurry and the food material in a plurality of containers;

(e) sealing said containers;

(f) heating the starch slurry and food materials sealed in said containers to a temperature of at least 210° F. for a period of about 14–20 minutes without degrading the starch derivative to effect sterilization of the starch slurry and food materials sealed in said containers; and (g) simultaneously moving said containers with agitation while heating to effect a uniform suspension of the food materials throughout the starch slurry after heating.

3. The method of claim 2, in which the starch slurry rapidly thickens while heating from a Brookfield viscosity of less than about 1,100 centipoise to a final Brookfield viscosity of at least about 3,000 centipoise.

4. The method of claim 2, in which the starch is a corn-based starch which is sufficiently cross-linked to enable the internal mass of said starch slurry and food materials to attain a temperature of about 240° F. in less than 14 to 20 minutes at a pH in the range of 3.0–4.5.

5. The method of claim 2, in which the starch derivative is a tapioca based starch which is sufficiently, cross-linked to enable the internal mass of said slurry and food materials to attain a temperature of about 210°–255° F. in less than 14 to 20 minutes at a pH in the range of 5.0 to 7.5.

* * * * *

UNITED STATES PATENT AND TRADEMARK OFFICE
CERTIFICATE OF CORRECTION

PATENT NO. : 4,120,983

DATED : October 17, 1978

INVENTOR(S) : Frank del Valle; John V. Tuschhoff; Charles E. Streaty

It is certified that error appears in the above-identified patent and that said Letters Patent are hereby corrected as shown below:

Column 3, line 11, for "media" read ---medium---
Column 8, line 48, for "twelve minutes" read ---twenty minutes---
Column 12, line 14, Claim 2, step (c), for "adjusting 3-7.5;" read
   ---adjusting the pH of said slurry to a range of 3-7.5;---

Signed and Sealed this

Twentieth Day of February 1979

[SEAL]

Attest:

RUTH C. MASON
Attesting Officer

DONALD W. BANNER
Commissioner of Patents and Trademarks